Dec. 24, 1940.  W. D. WALLING  2,226,033
QUICK OPENING VEHICLE HAULING COMPARTMENT
Filed Oct. 16, 1939
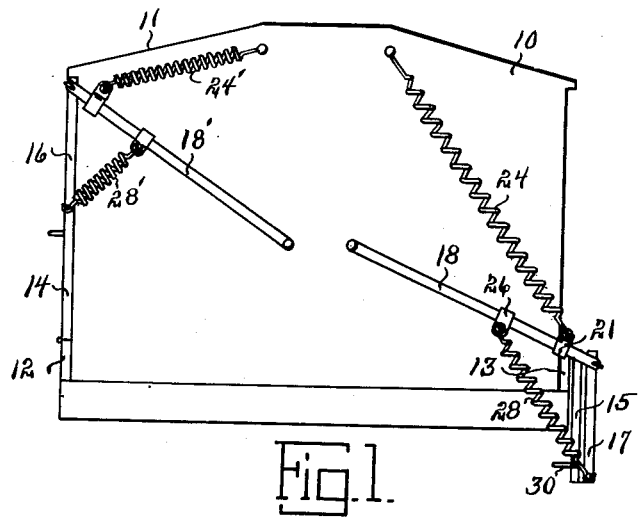
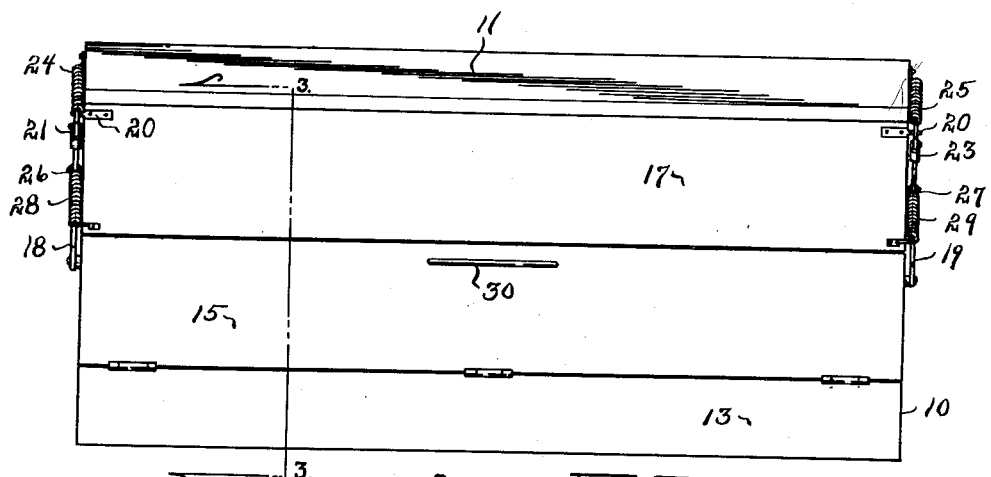
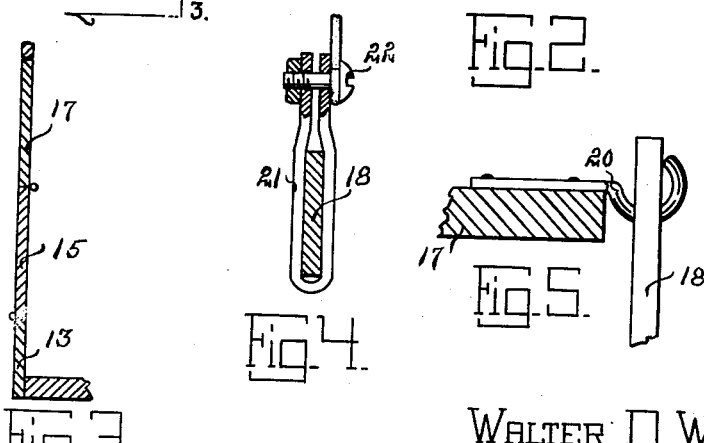
INVENTOR.
WALTER D. WALLING
BY M. Talbert Dick
ATTORNEY.

Patented Dec. 24, 1940

2,226,033

UNITED STATES PATENT OFFICE 2,226,033

QUICK OPENING VEHICLE HAULING COMPARTMENT

Walter D. Walling, Granger, Iowa, assignor of one-half to Channing C. Haskell, Granger, Iowa Application October 16, 1939, Serial No. 299,671

6 Claims. (Cl. 20—16)

The principal object of this invention is to provide a hauling compartment for a delivery or pick-up truck or a like vehicle that has side or end portions that may be quickly and easily manually opened or closed.

A further object of this invention is to provide a compartment having a foldable side door that is yieldingly held in a closed position when the same is so placed and is yieldingly held in an open position when so placed in that condition.

A still further object of my invention is to provide a compartment having a foldable toggle side door that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is an end view of my compartment with one of the side doors open and one side door closed.

Fig. 2 is a right side view of my compartment with the folding toggle door closed.

Fig. 3 is a cross-sectional view of my compartment taken substantially on line 3—3 of Fig. 2.

Fig. 4 is an enlarged plane view of one of the adjustable sleeves slidably mounted on one of the operating bars.

Fig. 5 is an enlarged view of the means for connecting one of the operating bars to a door section.

The use of doors and gates for closing the openings in a truck or like bodies are well known. Usually such doors or gates are not easily and quickly opened or closed, and when in a closed condition, they must be secured and locked to eliminate accidental opening. Although my invention may be employed on any compartment, where a quick opening and closing door is desired, my door is particularly adapted for the closing of large openings in the sides of the hauling compartment of trucks and like. More specifically, I find that my device is most useful in connection with milk can trucks. Most milk can trucks have a daily route where they stop at different farm homes and pick up a comparatively large number of cans of milk and cream. The truck bodies are usually free of openings in either sides or ends. Therefore, it is necessary for the vehicle operator to climb up on the truck each time a can is deposited in the truck or removed from the same. This is not only a loss in time and energy, but the work is further complicated by the necessity of a cover or like that should be placed over the tops of the cans for protecting the milk and cream from the sun.

I have overcome such problems by providing a compartment that may have a fixed top and with its side portion capable of having its major area opened or closed. By such an arrangement, the operator of the vehicle does not have to climb upon the vehicle to place or remove cans from the same, inasmuch as the major portion of the side of the compartment may be easily opened.

Referring to the drawing, I have used the numeral 10 to designate a compartment having a top 11. The numerals 12 and 13 designate two comparatively shallow vertical side walls extending upwardly from the bottom portion of the compartment as shown in Fig. 1. By this construction, comparatively large side openings are provided in the compartment extending from the tops of these members 12 and 13 to the top 11. My foldable toggle doors are designed to close these large side openings at times. The numeral 14 designates a section hingedly secured to the portion 12 along its adjacent edge and is capable of being swung outwardly from this side opening or capable of being swung upwardly to close a portion of the side opening. A similar section 15 is hingedly secured to the member 13. The numeral 16 designates a section hingedly secured to the free marginal edge of the member 14 and is capable of folding on to the inner side of the member 14 when the member 14 is in a lowered opened condition. These two sections 14 and 16 completely close the opening in the left side of the compartment when in closed condition. A similar section 17 is hinged to the free marginal edge of the member 15 for closing the other side opening of the compartment. When the openings in the compartment are closed by these sections, the section 14 will extend vertically above the member 12 and the section 16 will extend directly vertically above the section 14. Likewise the section 15 will extend vertically above the member 13 and the hinged section 17 will extend vertically above the section 15.

The equipment for toggling the sections 14 and 16 is an exact duplicate of the equipment for toggling the sections 15 and 17, and therefore, the equipment used on the sections 15 and 17 will only be described with similar movements for like equipment secured to the sections 14 and 16. The numeral 18 designates a bar having one end pivotally secured to the center portion of the rear end of the compartment. A like bar 19 is pivotally secured to the center portion of the front end of the compartment. The pivoted ends of these two bars 18 and 19 are slightly below the horizontal plane of the upper marginal edges of the sections 14 and 15 when these sections are in a closed condition. When all of the side sections are in a closed condition, the bars 18 and 19 will extend upwardly and outwardly and are pivotally secured at their outer ends by hook members 20 to the upper two corner portions of the section 17, as shown in Fig. 2 and Fig. 5. The numeral 21 designates a slidable mounted sleeve on the length of the bar 18. This sleeve is capable of being tightened and held on the bar against movement by the bolt 22. A similar sleeve 23 is on the bar 19. These adjustable sleeves 21 and 23 are normally located near the outer free ends of the bars. The numeral 24 designates a coil spring having one end secured to the upper rear end of the compartment, and its other end secured by a suitable means to the sleeve 21, as shown in Fig. 1. A similar spring 25 has one end secured to the upper front end of the compartment and its other end operatively secured to the sleeve 23. Obviously when the section 17 is in a closed condition, its upper corner portions will be yieldingly held toward the compartment against accidental opening and against rattle. The numeral 26 designates a second similar adjustable sleeve and bolt on the bar 18, and located on the bar between its inner end and the sleeve 21. A similar sleeve and bolt 27 is on the bar 19. The numeral 28 designates a coil spring having one end operatively secured to the sleeve 26 and its other end operatively secured to the lower left corner of the section 17, as shown in Fig. 2. A like spring 29 has one end operatively secured to the sleeve 27 and its other end operatively secured to the lower right hand corner portion of the section 17, as shown in Fig. 2. When the sections 15 and 17 are in closed condition, these springs 28 and 29 yieldingly hold the lower corners of the section 17 and the upper marginal edge portion of the section 15 in due contact with and toward the body of the compartment. The numeral 30 designates a handle member on the upper central portion of the section 15.

To open the right side of the compartment it is now necessary to pull outwardly and downwardly on the handle 30. This action causes the section 15 to spring outwardly and downwardly into vertical downwardly extending positions, but due to the pivoting action, the lower portion of the section 17, which is hinged to the section 15, will move outwardly and downwardly until it has moved on to the inner side of the section 15 with its upper end portion still uppermost and with its plane still in the vertical but parallel with the section 15, as shown in Fig. 1. The beginning of the movement of these two sections into an open and folded condition is against the yielding action of the springs 24, 25, 28, and 29, but after the bars 18 and 19 toggle past their centers, relative to the pull of these springs, the springs will then tend to pull and hold the sections 15 and 17 in an open position, as shown in Fig. 1. This toggle action permits the yieldingly holding of the section either in an open condition or a closed condition. To close this side of the compartment it is merely necessary to move the lower end of the member 15 outwardly and upwardly past the dead center after which the springs will move the sections 15 and 17 into a closed condition, as shown in Fig. 2. Regardless of whether the sections 15 and 17 are in open or closed positions, the sleeves will yieldingly hold them in position and against rattle or noise.

Each side of the hauling compartment may be equipped with sides capable of being opened and as herein noted, each side would be substantially a duplicate of the other. In Fig. 1, I have used the numerals 18', 24' and 28' to designate duplicates of the arms 18, 24, and 28 at the other side of the compartment.

Some changes may be made in the construction and arrangement of my improved quick opening vehicle hauling compartment without departing from the real spirit and purpose of my invention, and it is my intention to cover by my claims any modified forms of structure or use of mechanical equivalents which may be reasonably included within their scope.

I claim:

1. In a device of the class described, a compartment having an opening, a closing section hinged along one of its marginal edges to said compartment and capable of closing a portion of said opening at times; said section capable of being swung outwardly away from said opening, a second closing section hingedly secured to the opposite marginal edge portion of said first mentioned section and capable of closing a portion of said opening at times; said second closing section capable of being swung inwardly adjacent the inner side of first section when said first section is in an open position, a bar having one end pivotally secured to said compartment and its other end pivotally secured to the upper corner portion of said second section, a coil spring having one end secured to said bar and its other end secured to the lower corner portion of said second mentioned section, and a second spring having one end secured to said compartment and its other end secured to said bar; said springs and said bar being so positioned that said springs will toggle with said bar for yieldingly holding said two sections in a closing condition over said opening or in an open condition away from said opening.

2. In a device of the class described, a compartment having an opening, a closing section hinged along one of its marginal edges to said compartment and capable of closing a portion of said opening at times; said section capable of being swung outwardly away from said opening, a second closing section hingedly secured to the opposite marginal edge portion of said first mentioned section and capable of closing a portion of said opening at times; said second closing section capable of being swung inwardly adjacent the inner side of first section when said first section is in an open position, a bar having one end pivotally secured to said compartment and its other end pivotally secured to the upper corner portion of said second section, a coil spring having one end adjustably secured to said bar and its other end secured to the lower corner portion of said second mentioned section, and a second spring having one end secured to said compartment and its other end adjustably secured to said bar; said springs and said bar being so positioned that said springs will toggle with said bar for yieldingly holding said two sections in a closing condition over said opening or in an open condition away from said opening.

3. In a device of the class described, a compartment housing having an opening in one of its sides, a closing section having its lower marginal edge hingedly secured to said housing capable of being swung in one direction for closing a portion of said opening and capable of being swung outwardly and downwardly to an open position, a second closing section hingedly secured to the free end of said first section capable of closing a portion of said opening at times and capable of being swung adjacent the inner side of said first section when said first section is in an open position, a bar having one end adjacently secured to said housing at a point below the plane of the upper marginal edge of said first section when said first section is in a closed position, and its other end adjacently secured to the upper corner portion of said second section, a coil spring having one end secured to the upper portion of said housing and its other end secured to said bar, and a second spring having one end secured to said bar and its other end secured to one of the lower corner portions of said second section; said springs and said bar being so positioned one to the other that said springs and said bar will provide a toggle action for yieldingly holding said sections in a closed condition or in an open condition.

4. In a device of the class described, a compartment housing having an opening in one of its sides, a closing section having its lower marginal edge hingedly secured to said housing capable of being swung in one direction for closing a portion of said opening and capable of being swung outwardly and downwardly to an open position, a second closing section hingedly secured to the free end of said first section capable of closing a portion of said opening at times and capable of being swung adjacent the inner side of said first section when said first section is in an open position, a bar having one end adjacently secured to said housing at a point below the plane of the upper marginal edge of said first section when said first section is in a closed position, and its other end adjacently secured to the upper corner portion of said second section, a coil spring having one end secured to the upper portion of said housing and its other end secured to said bar, and a second spring having one end secured to said bar and its other end secured to one of the lower corner portions of said second section; said springs and said bar being so positioned one to the other that said springs and said bar will provide a toggle action for yieldingly holding said sections in a closed condition or in an open condition, and a handle member on one of the said sections.

5. In a device of the class described, a housing having an opening in one of its sides, a shallow side wall on the bottom of said housing extending upwardly into said opening, a closing section having its lower marginal edge hingedly secured to the upper marginal edge of said wall; said section capable of being swung from an upwardly extending closing condition to a downwardly extending open position, a second closing section hingedly secured at its lower marginal edge to the upper marginal edge of said first section when said first section is in a closing condition; said second section capable of being swung inwardly adjacent the inner side of said first section when said first section is in an open condition, a bar having one end adjacently secured to said housing at a point below the plane of the upper marginal edge of said first section when said first section is in a closed position, and its other end adjacently secured to the upper corner portion of said second section, a coil spring having one end secured to the upper portion of said housing and its other end secured to said bar, and a second spring having one end secured to said bar and its other end secured to one of the lower corner portions of said second section; said springs and said bar being so positioned one to the other that said springs and said bar will provide a toggle action for yieldingly holding said sections in a closed condition or in an open condition, and a handle member on one of the said sections.

6. In a device of the class described, a compartment having an opening, a section for closing the lower portion of said opening at times, a hinge means rigidly secured to said compartment along the lower marginal edge of its opening and rigidly to said section for hingedly securing said section to said compartment, whereby said section may be swung outwardly and downwardly away from said opening or upwardly for closing the lower portion of said opening, a second section hingedly secured to said first mentioned section and capable of closing the upper portion of said opening at times; said second section capable of being swung inwardly and downwardly adjacent the inner side of said first section when said first section is in an open lowered position, a bar having one end pivotally secured to said compartment and its other end pivotally secured to the upper portion of said second section, a coil spring having one end secured to said bar, a substantial distance from its outer end and its other end secured to the lower portion of said second section, a second spring having one end secured to said compartment and its other end secured to said bar at a point to the rear of where said first mentioned spring is secured to said bar; said springs and said bar being so positioned that said springs will toggle with said bar for yieldingly holding said sections in closed condition over said opening or in an open condition away from said opening.

WALTER D. WALLING.